United States Patent
Slavin

(10) Patent No.: US 6,751,362 B2
(45) Date of Patent: Jun. 15, 2004

(54) PIXEL RESAMPLING SYSTEM AND METHOD FOR TEXT

(75) Inventor: Keith R. Slavin, Beaverton, OR (US)

(73) Assignee: Micron Technology, Inc., Boise, ID (US)

( * ) Notice: Subject to any disclaimer, the term of this patent is extended or adjusted under 35 U.S.C. 154(b) by 632 days.

(21) Appl. No.: 09/759,787

(22) Filed: Jan. 11, 2001

(65) Prior Publication Data
US 2002/0135592 A1 Sep. 26, 2002

(51) Int. Cl.$^7$ .................................................. G06K 9/32
(52) U.S. Cl. ...................... 382/299; 382/282; 382/274; 348/254; 358/519
(58) Field of Search .............................. 382/299, 282, 382/218, 254, 274, 199, 201, 205, 107; 345/698, 600, 699, 20, 63, 77; 358/3.1, 461, 3.2, 464, 519; 340/507; 250/205; 348/251, 254; 709/247

(56) References Cited

U.S. PATENT DOCUMENTS

| | | | |
|---|---|---|---|
| 4,282,546 A | 8/1981 | Reitmeier | 358/1 |
| 4,578,812 A | 3/1986 | Yui | 382/1 |
| 4,630,307 A | 12/1986 | Cok | 382/1 |
| 5,054,100 A | 10/1991 | Tai | 382/1 |
| 5,373,147 A * | 12/1994 | Noda | 235/462.08 |
| 5,621,546 A * | 4/1997 | Klassen et al. | 358/536 |
| 5,703,965 A | 12/1997 | Fu et al. | 382/232 |
| 5,758,091 A * | 5/1998 | Hannah | 709/247 |
| 5,889,894 A | 3/1999 | Ito et al. | 382/300 |
| 5,910,796 A * | 6/1999 | Gormish | 345/600 |
| 5,930,407 A | 7/1999 | Jensen | 382/300 |
| 5,987,192 A * | 11/1999 | Maltsev et al. | 382/298 |
| 5,995,682 A | 11/1999 | Pawlicki et al. | 382/300 |
| 6,018,597 A | 1/2000 | Maltsev et al. | 382/260 |
| 6,198,512 B1 * | 3/2001 | Harris | 348/603 |
| 6,310,546 B1 * | 10/2001 | Seta | 340/507 |
| 6,317,158 B1 * | 11/2001 | Tice | 348/447 |
| 6,490,364 B2 * | 12/2002 | Hanna et al. | 382/107 |
| 6,535,651 B1 | 3/2003 | Aoyama et al. | 382/300 |
| 6,594,393 B1 * | 7/2003 | Minka et al. | 382/218 |

OTHER PUBLICATIONS

Catmull, E. et al., "A Class of Local Interpolating Splines", Computer Aided Geometric Design, New York, Academic Press, 1974, pp. 317–326.
Hill, F.S., Jr., "Computer Graphics Using Open GL", New Jersey, Prentice–Hall, 2001, pp. 643–653.
Kochanek, D. et al., "Interpolating Splines with Local Tension, Continuity, and Bias Control", Computer Graphics, vol. 18, No. 13, Jul. 1984. pp. 33–41.

* cited by examiner

Primary Examiner—Timothy M. Johnson
Assistant Examiner—Barry Choobin
(74) Attorney, Agent, or Firm—Dorsey & Whitney LLP

(57) ABSTRACT

A method and system for determining a transition model between input pixel samples from which output sample values are calculated based on various relative background and brightness conditions of the input pixel samples. A brightness condition is determined from the input sample values associated with the input pixel samples. A first transition model that preserves a constant luminance is used where the brightness condition is indicative of light isolated pixels and a second transition model that preserves a constant darkness is used where the brightness condition is indicative of dark isolated pixels. The resampling circuit may also use alternative models for other brightness conditions, such as for pixel transitions without any emphasis or alternating pixels. The resampling circuit may also perform modified operations for pixels arranged in a diagonal fashion.

51 Claims, 3 Drawing Sheets

PIXEL RESAMPLING SYSTEM AND METHOD FOR TEXT

TECHNICAL FIELD

The present invention is related generally to the field of computer graphics, and more particularly, a system and method for resampling graphics data of a source image to produce a destination image.

BACKGROUND OF THE INVENTION

As display devices of various sizes and increased resolution have been developed and the demand for them have increased, the ability for a graphics processing system to resize and resample source images and create destination images to take advantage of the various sized and higher resolution displays is a desirable operation. In an electronic display system, color at each pixel is represented by a set of color components, and each color component is represented by a sample value. Color components such as red, green, blue (RGB) or other representations such as $YC_bC_r$ are well known in the art. Whichever representation is chosen, each color component can be interpreted as a two dimensional array of samples, so three such arrays can represent images on display systems. Conceptually, resampling can be viewed as a spatial process, working on discrete input samples, represented by pixels of the source image arranged in a two-dimensional bitmap. The output samples of the destination image are spatially located at fractional sample positions within the input sample grid. Various interpolation and modeling methods are used to construct transition models between samples of the source image from which additional graphics data is produced during the resampling operation.

The additional graphics data is then used to produce larger or higher resolution destination graphics images. However, the resulting destination image must retain an acceptable image quality with respect to the source image. That is, the destination image should appear to retain at least a similar visual qualities of the source image, such as having nearly the same color balance, contrast, and brightness as the original source image. Otherwise, rather than accurately reproducing a larger or higher resolution graphics image of the source image, the resampling operation will compromise image quality by introducing image distortion. To this end, various resampling algorithms have been developed in order to create high quality destination graphics images.

With many conventional resampling algorithms, a transition model between input samples along each axis is constructed to provide output sample values. Generally good results can be obtained with separable processing along each axis for graphics images because image feature cross-sections have the same characteristics when viewed at any angle within the image plane, only at different effective sample rates. The transition models between the input samples are constructed such that the output samples interpolated from the transition model create a destination image that closely resembles the original or source image. The transition models are typically continuous so that an output sample can be generated at any position between the input samples.

Although an axis separable cubic model between two input samples can provide a model with very desirable reconstruction characteristics, algorithms for resampling and sharpening graphics data representing one type of graphics images often are not suitable for resizing and resampling graphics data representing another type of graphics images. For example, resampling graphics data representing text images differs from resampling graphics data representing video in that the resampling process used to interpolate destination pixels from the source image for text typically assumes some sort of plateau model around each pixel with no overshoots between pixels of different color levels. Therefore, only input samples either side of an output sample contribute to the value of the destination pixel. As a result, if text resampling models are used for graphics data representing video, it tends to produce blurry transitions on a computer monitor, and original image line structure is often visible. Moreover, algorithms for resampling bitmaps are generally more difficult to design than those for resampling video signals, because there is an expectation of presenting clear and legible text in an output image. Also, there is no restriction in how close the viewer gets the monitor, unlike video where 3× picture height is the recommended minimum viewing distance.

Text images have several important visual attributes, such as contrast, uniformity, sharpness, and font size. The use of two highly contrasting text levels on a high resolution monitor will produce nicely readable text for a range of font sizes. However, the challenge is to retain these attributes after resampling. In the ideal case, artificial intelligence could analyze text and figure out how to resize text using just the original text and background levels (pixel replication). This approach could potentially maintain absolute text quality, while preserving its essential attributes. In practice, however, text analysis and reconstruction is an extremely complex human perceptual problem, involving many iterative weighting measurements. For example, text may contain subtle variations which to some degree need to be preserved on the output, notably bold verses regular text, so we should not be too aggressive in thickening text.

Using simple pixel replication for up-sampling text by integer ratios typically produces excellent results. All relative and absolute text aspects listed above are maintained although the perceived brightness or darkness relative to the original image may increase slightly due to the increase in isolated feature sizes. However, for up-sampling text by a small non-integer up-sample ratio, the operation is much harder in that the profile of an isolated input pixel cannot be represented with an exact number of output pixels. For example, if a source image is up-samples by a ratio of 1.25:1, an isolated input pixel cannot be represented as 1.25 output pixels. Instead, the isolated input pixel is represented by a single output pixel, two output pixels, or one or two output pixels supplemented with use of gray levels.

Single or two pixel representation requires knowledge of the surrounding pixels at a given position, in order to determine whether a pixel is isolated. If some pixels are narrowed, others must be widened to compensate, or vice-versa. Compensation should only occur in larger features (2 or more pixels wide) so that visible artifacts are minimized. With alternating extreme pixel levels, no such compensation is possible, and the uneven widths of features can become visible.

Single pixel narrowing maintains sharpness and intensity but causes the following negative effects: inconsistent pixel placement and visible gapping. With inconsistent pixel placement, an output sample may not lie exactly on top of an input sample, and a character's shape may appear to change when rendered in different places, depending upon its position with respect to the output sampling grid. With visible gapping, visible gaps may appear in single-pixel diagonal lines on the input. Many characters have diagonal edges, and the eye sees these gaps very readily.

If we represent an isolated input pixel as a two output pixel profile, then we can fix the diagonal problem, but we are still inconsistent in line placement, and the perceived line width increase (2/1.25=1.6x) is noticeable in absolute terms. The biggest problem with this approach is loss of internal detail in dense characters (i.e., where isolated pixels can be separated by as few as two pixels) a problem so severe that sometimes the enclosed region in an 'e' could be barely visible.

Therefore, there is a need for a method and system that is suitable for resampling graphics data representing text images.

SUMMARY OF THE INVENTION

The present invention relates to a method and system for determining a transition model between input pixel samples from which output sample values are calculated based on various relative background and brightness conditions of the input pixel samples. A resampling circuit determines a brightness condition from the input sample values associated with the input pixel samples. Based on the brightness condition, a first transition model that preserves a constant luminance is used where the brightness condition is indicative of light isolated pixels. Where the brightness condition is indicative of dark isolated pixels, the resampling circuit uses a second transition model that preserves a constant darkness from which output sample values are calculated. The resampling circuit may also use alternative models for other brightness conditions, such as for pixel transitions without any emphasis or alternating pixels. The resampling circuit may also perform modified operations for pixels arranged in a diagonal fashion.

DETAILED DESCRIPTION OF THE INVENTION

Embodiments of the present invention provide models having different gradients for various relative background and brightness conditions for resampling graphics data. The models are particularly suited for resampling graphics data representing text images, however, the models may be applied for graphics data representing other types of graphics images. Certain details are set forth below to provide a sufficient understanding of the invention. However, it will be clear to one skilled in the art that the invention may be practiced without these particular details. In other instances, well-known circuits, control signals, timing protocols, and software operations have not been shown in detail in order to avoid unnecessarily obscuring the invention.

Figure 1:
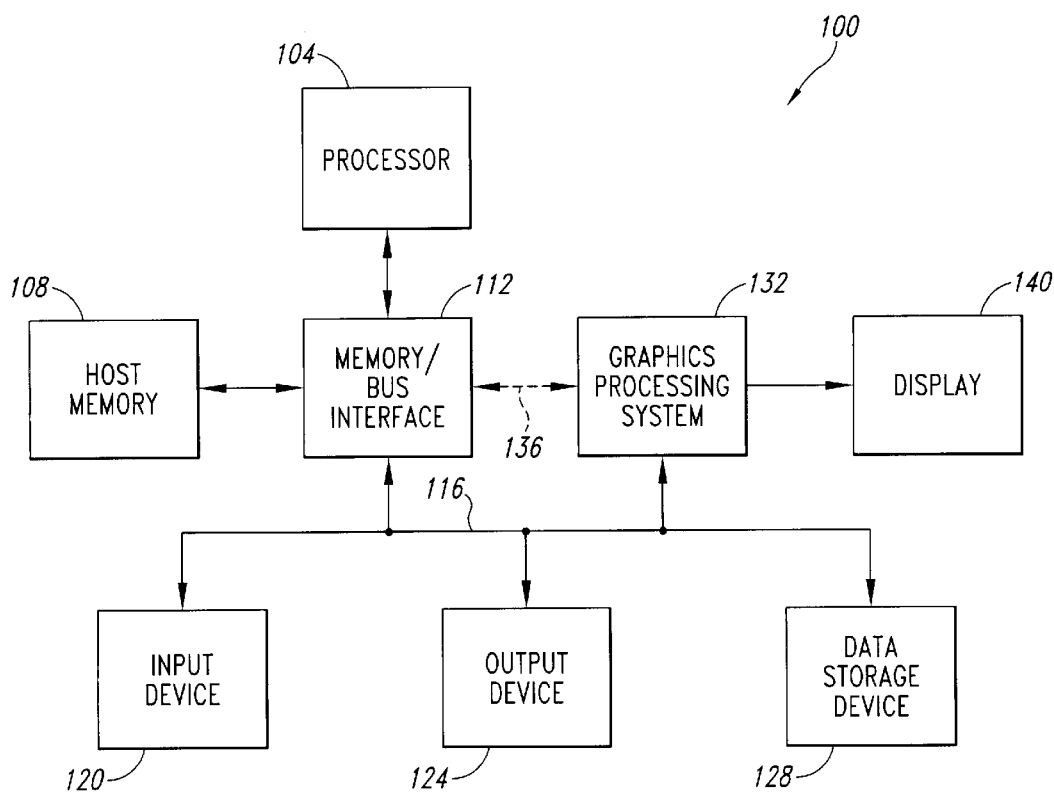
FIG. 1 is a block diagram of a computer system in which embodiments of the present invention are implemented.

FIG. 1 illustrates a computer system 100 in which embodiments of the present invention are implemented. The computer system 100 includes a processor 104 coupled to a host memory 108 through a memory/bus interface 112. The memory/bus interface 112 is coupled to an expansion bus 116, such as an industry standard architecture (ISA) bus or a peripheral component interconnect (PCI) bus. The computer system 100 also includes one or more input devices 120, such as a keypad or a mouse, coupled to the processor 104 through the expansion bus 116 and the memory/bus interface 112. The input devices 120 allow an operator or an electronic device to input data to the computer system 100. One or more output devices 120 are coupled to the processor 104 to provide output data generated by the processor 104. The output devices 124 are coupled to the processor 104 through the expansion bus 116 and memory/bus interface 112. Examples of output devices 124 include printers and a sound card driving audio speakers. One or more data storage devices 128 are coupled to the processor 104 through the memory/bus interface 112 and the expansion bus 116 to store data in, or retrieve data from, storage media (not shown). Examples of storage devices 128 and storage media include fixed disk drives, floppy disk drives, tape cassettes and compact-disc read-only memory drives.

The computer system 100 further includes a graphics processing system 132 coupled to the processor 104 through the expansion bus 116 and memory/bus interface 112. Optionally, the graphics processing system 132 may be coupled to the processor 104 and the host memory 108 through other types of architectures. For example, the graphics processing system 132 may be coupled through the memory/bus interface 112 and a high speed bus 136, such as an accelerated graphics port (AGP), to provide the graphics processing system 132 with direct memory access (DMA) to the host memory 108. That is, the high speed bus 136 and memory bus interface 112 allow the graphics processing system 132 to read and write host memory 108 without the intervention of the processor 104. Thus, data may be transferred to, and from, the host memory 108 at transfer rates much greater than over the expansion bus 116. A display 140 is coupled to the graphics processing system 132 to display graphics images. The display 140 may be any type of display, such as a cathode ray tube (CRT), a field emission display (FED), a liquid crystal display (LCD), or the like, which are commonly used for desktop computers, portable computers, and workstation or server applications.

Figure 2:
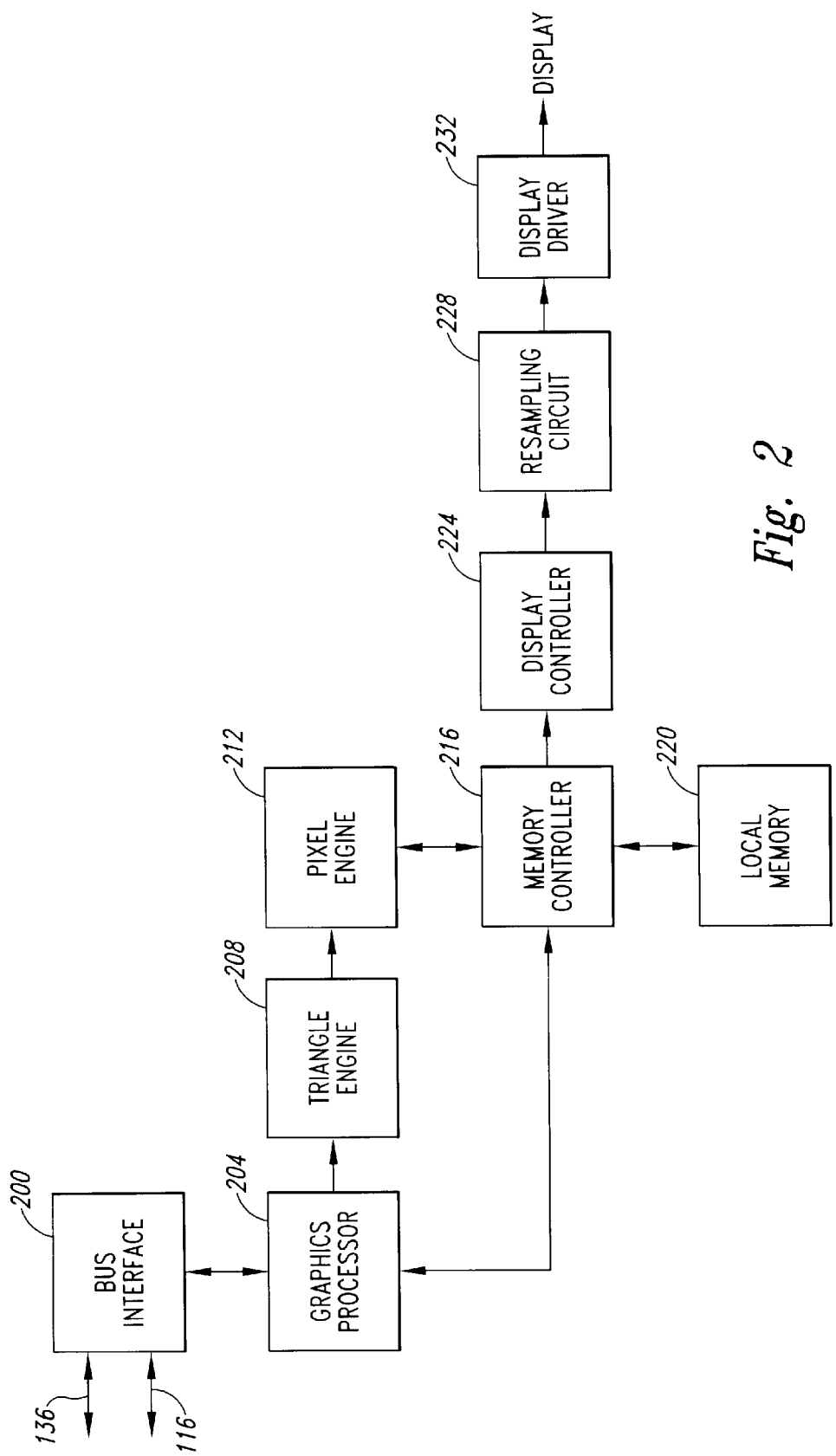
FIG. 2 is a block diagram of a graphics processing system in the computer system of FIG. 1.

FIG. 2 illustrates circuitry included within the graphics processing system 132 for performing various three-dimensional (3D) graphics functions. As shown in FIG. 2, a bus interface 200 couples the graphics processing system 132 to the expansion bus 116. In the case where the graphics processing system 132 is coupled to the processor 104 and the host memory 108 through the high speed data bus 136 and the memory/bus interface 112, the bus interface 200 will include a DMA controller (not shown) to coordinate transfer of data to and from the host memory 108 and the processor 104. A graphics processor 204 is coupled to the bus interface 200 and is designed to perform various graphics and video processing functions, such as, but not limited to, generating vertex data and performing vertex transformations for polygon graphics primitives that are used to model 3D objects. The graphics processor 204 is coupled to a triangle engine 208 that includes circuitry for performing various graphics functions, such as clipping, attribute transformations, rendering of graphics primitives, and generating texture coordinates for a texture map.

A pixel engine 212 is coupled to receive the graphics data generated by the triangle engine 208. The pixel engine 212 contains circuitry for performing various graphics functions, such as, but not limited to, texture application or mapping, bilinear filtering, fog, blending, and color space conversion.

A memory controller 216 coupled to the pixel engine 212 and the graphics processor 204 handles memory requests to and from an local memory 220. The local memory 220 stores graphics data, such as source pixel color values and destination pixel color values. A display controller 224 is coupled to the memory controller 216 to receive processed destination color values for pixels that are to be rendered. Coupled to the display controller 224 is a resampling circuit 228 that facilitates resizing or resampling graphics images. As will be explained below, embodiments of the resampling circuit 228 perform approximations that simplify the calculation of a model between two sample points for use during resampling. The output color values from the resampling circuit 228 are subsequently provided to a display driver 232 that includes circuitry to provide digital color signals, or convert digital color signals to red, green, and blue analog color signals, to drive the display 140 (FIG. 1).

Although the resampling circuit 228 is illustrated as being a separate circuit, it will be appreciated that the resampling circuit 228 may also be included in one of the aforementioned circuit blocks of the graphics processing system 132. For example, the resampling circuit 228 may be included in the graphics processor 204 or the display controller 224. In other embodiments, the resampling circuit 228 may be included in the display 140 (FIG. 1). Therefore, the particular location of the resampling circuit 228 is a detail that may be modified without deviating from the subject matter of the invention, and should not be used in limiting the scope of the present invention.

Figure 3:
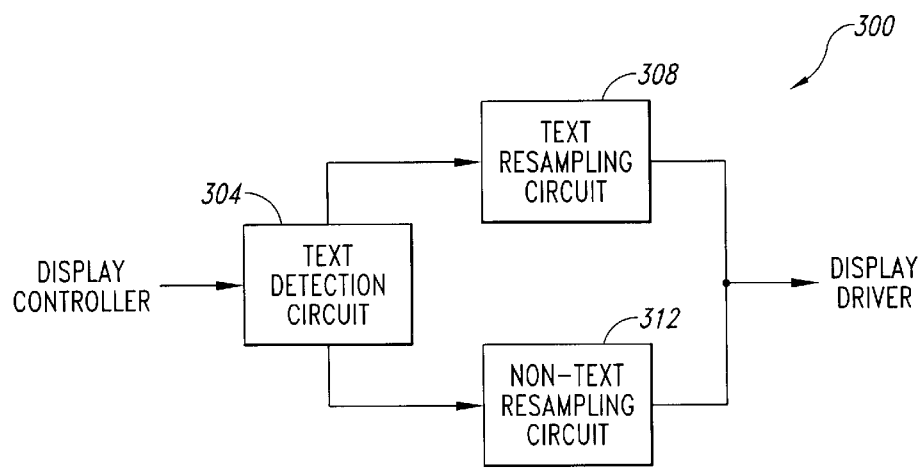
FIG. 3 is a block diagram of a resampling circuit in the graphics processing system of FIG. 2 according to an embodiment of the present invention.

FIG. 3 illustrates a resampling circuit 300 that may be substituted for the resampling circuit 228 shown in FIG. 2. The resampling circuit 300 includes a text detection circuit 304 for determining if a sample region is likely to include graphics data representing text images. The resampling circuit 300 may employ any conventional text detection algorithm. many of which are well known to those of ordinary skill in the art. Additionally, the text detection circuit 304 may be substituted by the text detection circuit and method described in co-pending U.S. patent application having Ser. No. 09/746,636, entitled SYSTEM AND METHOD FOR DETECTING TEXT IN MIXED GRAPHICS DATA, to Slavin, filed Dec. 21, 2000, which is incorporated herein by reference. In summary, text detection is performed by hierarchically sub-dividing a sample region with even numbers of samples into two sub-regions with even number of samples, and re-dividing until all regions contain just two samples each. Each two sample region is then processed to determine if it contains two or one sample levels, returning the sorted sample values and number of different levels to its parent region in the hierarchy. The parent then determines if there are a tally of 3 or more, 2, or 1 sample levels in its two regions, and returns this tally and the sorted sample values if 2 levels lie in the region. This process continues up the hierarchy until the entire region of interest can determine if 3 or more, 2, or 1 sample levels lie within it. The tally value generated for the sample region is indicative of whether two or fewer sample values are represented by the samples of the sample region.

The resampling circuit 300 further includes is a text resampling circuit 308 and a non-text resampling circuit 312. Embodiments of the present invention provide a text resampling circuit 308 that determines suitable transition models from which resampled values may be calculated. As mentioned previously, the resampling operations used for resampling graphics data representing text images is often different than that used for resampling other graphics data representing other types of graphics images, such as video. Although one resampling algorithm may be used, the image quality of one or the other types of graphics data will be compromised. Thus, two different resampling operations are used for the different types of graphics data.

The non-text resampling circuit 312 can perform conventional resampling operations that are well known to those of ordinary skill in the art. Alternatively, a resampling operation such as that described in co-pending U.S. patent application having U.S. Ser. No. 09/760,173, entitled PIXEL RESAMPLING SYSTEM AND METHOD to Slavin, filed Jan. 12, 2001, which is incorporated herein by reference, can also be performed by the non-text resampling circuit 312. In summary, the subject matter of the aforementioned patent application includes generating a cubic model for transitions between adjacent samples from the sample values and the gradient values co-sited with the two samples. The co-sited gradients are approximated to facilitate generation of the transition model. The coefficients for the cubic model are determined from the known values and used by a cubic model evaluation circuit to calculate resampled values between the adjacent samples. As will be explained in more detail below, the cubic model evaluation circuit described in the aforementioned patent application may be used with the present invention to determine resampled values for graphics data including text images.

It will be appreciated that the sample values for the samples may consist of several different components. For example, the sample value may represent pixel colors which are the combination of red, green, and blue color components. Another example includes sample values representing pixel colors which are the combination of luma and chroma components. Consequently, because it is well understood in the art, although circuitry to perform graphics operation for each of the components is not expressly shown or described herein, embodiments of the present invention include circuitry, control signals, and the like necessary to perform resampling operations on each component for multi-component sample values. Moreover, it will be appreciated that embodiments of the present invention further include the circuitry, control signals, and the like necessary to perform axis separable resampling operations for graphics data represented in multiple axes. Implementation of axis separable resampling is well understood in the art, and a more detailed description of such has been omitted from herein to avoid unnecessarily obscuring the present invention.

In operation, when a resampling operation is to be performed, the resampling circuit 300 becomes active and the text detection circuit 304 receives sample values for the samples of graphics data of the source image to be resampled. Based on a sampling of the graphics data received by the resampling circuit 300, the text detection circuit 304 determines whether the graphics data includes text image components. If so, the text detection circuit 304 identifies the graphics data as containing text and provides the graphics data to the text resampling circuit 308. All other graphics data are provided to the non-text resampling circuit 312 for the resampling operation.

As will be explained in more detail below, the text resampling circuit 308 determines from the graphics data it receives a transition model from which resampled values may be calculated. Each of the respective resampling circuits perform various operations to resample the graphics data received from display controller 224 (FIG. 2) to produce a resampled graphics image. The resampled data generated by the resampling circuits are subsequently used in the process of rendering enlarged or higher resolution graphics images.

As mentioned previously, embodiments of the present invention provide a transition model for resampling graphics data representing text images and which accounts for the monitor display gamma. As well understood in the art, the gamma function of a display can be represented by:

$$Y = (Y')^{gm} \quad \text{(EQ 1)}$$

where Y' is a normalized gamma corrected voltage of range 0 to 1, and luminance Y is proportional to light power per projected area. In practice, the value of gamma gm for a conventional monitor is in the range of 2.0 to 2.5. A display gamma value of gm=2.5 will be assumed for the description of embodiments of the present invention. However, it will be appreciated that the value of gm=2.5 is provided merely by way of example, and that other values of gamma may be substituted instead without deviating from the scope of the present invention. The behavior of gamma will be described in more detail below with respect to the determination of transition models for resampling text images.

Figure 4:
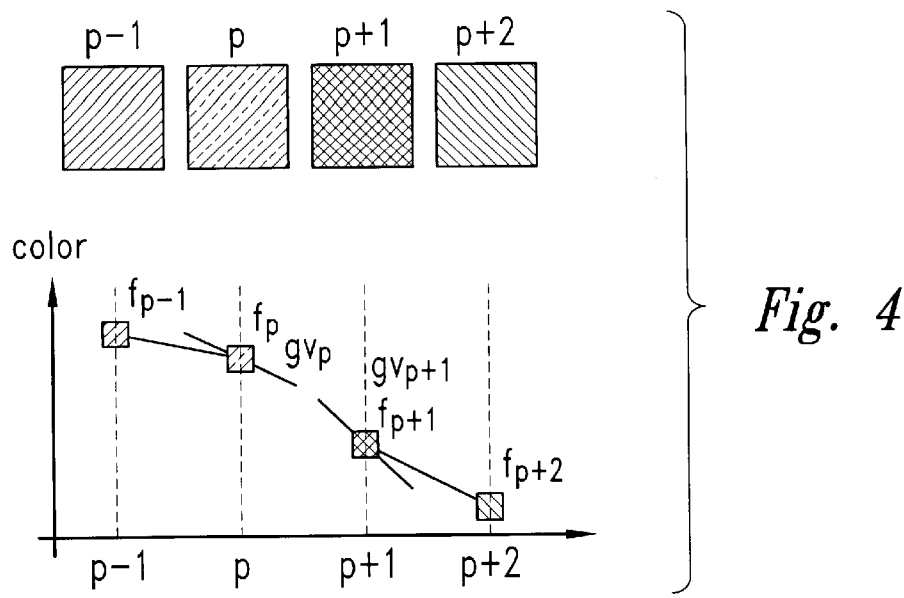
FIG. 4 is a diagram representing a sample of graphics data and corresponding sample values.

Illustrated in FIG. 4 is representation of four pixel positions p−1, p, p+1, and p+2, and the respective sample values $f_{p-1}$, $f_p$, $f_{p+1}$, and $f_{p+2}$ of a source image. A cubic model may be used between two input samples p and p+1 to provide a continuous model having desirable reconstruction characteristics for graphics images. A piece-wise cubic polynomial model along an axis will be valid over a fractional input sample position Δp from 0 to 1. Consequently, the model is valid from integer sample position p to p+1:

$$f(P + \Delta p) = \sum_{i=0}^{3} C[P, i](\Delta p)^i. \quad \text{(EQ 2)}$$

The resulting cubic model will go through the two input samples p and p+1.

As is well known, a cubic model can be solved with four constraints. Two of these constraints may be provided by the sample values $f_p$ and $f_{p+1}$ at the two input samples p and p+1. These sample values are known. Two additional constraints may be provided by the gradients $gr_p$ and $gr_{p+1}$ at, or co-sited with, the two input samples p and p+1. To solve the co-sited gradients, the equation for the cubic model is differentiated with respect to Δp, resulting in:

$$gr(P + \Delta p) = \sum_{i=0}^{3} iC[P, i](\Delta p)^{i-1}. \quad \text{(EQ 3)}$$

Evaluating the two equations at Δp={0, 1}, and solving for the four coefficients C[P, i] at the relative positions of the contributors to the cubic model are of interest results in coefficients:

$$k = f_1 - f_0$$

$$C_3 = gr_1 + gr_0 - 2k$$

$$C_2 = k - C_3 - gr_0$$

$$C_1 = gr_0$$

$$C_0 = f_0 \quad \text{(EQ 4)}$$

for the cubic equation:

$$f(\Delta p) = \sum_{i=0}^{3} C_i(\Delta p)^i. \quad \text{(EQ 5)}$$

The resulting cubic equation, along with the gradients $gr_0$ and $gr_1$ and the sample values $f_0$ and $f_1$ for the two input samples p and p+1 provides a piece-wise continuous model for resampling.

The method of determining the resampled values using a cubic transition model is desirable where a resampling circuit is equipped with an cubic model evaluation block. The resampling operation employs a conventional cubic evaluation circuit, which is well known in the art. Although not described in greater detail herein, implementation of a cubic model evaluation block is well understood by those of ordinary skill in the art, and the description provided herein is sufficient to allow one to practice the invention without undue experimentation. In an alternative hardware implementation, the resulting cubic models for text (not video) could be pre-evaluated in software and loaded into RAMs for a range of fractional sample position values. The RAM contents could also undergo minor ad-hoc adjustments to improve performance still further. Additionally, a suitable cubic evaluation circuit for implementing embodiments of the present invention is included in the system described in the aforementioned co-pending application, SYSTEM AND METHOD FOR DETECTING TEXT IN MIXED GRAPHICS DATA. Included in the graphics processing system described therein are a text detection circuit and text resampling circuit in which embodiments of the present invention may be practiced.

As mentioned previously, embodiments of the present invention provide resampled values using models having different gradients for various relative background and text brightness conditions. To obtain the gradients $gr_0$ and $gr_1$ for use in EQ 4 we do the following simple test:

```
if (f1 > f0)
{
    gr1 = g__lt;
    gr0 = g__dk;
}
else
{
    gr0 = g__lt;
    gr1 = g__dk;
}
``` where g__lt is the gradient at the light pixel, and g__dk is the gradient at the darker pixel.

Examples of the various relative background and text brightness include "alternating" pixels, and "isolated" and "surrounding" pixels. Alternating pixels are input pixel values that alternate from one text level to the other along either axis. For example, alternating horizontal or vertical lines (but not both at once) produce a bitmap of alternating pixels along the y and x axes respectively. Isolated pixels are surrounded by one pixel of the other text level on both sides. Isolation of a pixel is defined independently along each axis. If two adjacent pixels are both flagged to be emphasized (as is the case for alternating pixels), then the transition between them cannot emphasize both, so neither is emphasized. For example, a 5(wide)×N(height) rectangle with the luminance pattern {0, 0, 1, 0, 0} on each of its horizontal lines defines a vertical line (N samples high) of horizontally isolated pixels at the 1 sample. As both 0 values adjacent to the 1 are not emphasized (because each O has a 0 neighbor), then the 1 is emphasized on horizontal transitions to both its neighboring 0 samples. A more detailed description of methods for identifying isolated and alternating pixels in pixel samples will be provided following the description of the various transitions models.

A model that preserves the sum of a set of sample values can be determined and then modified to preserve luminance for bright isolated pixels, and darkness for dark isolated pixels. The resulting model is used to generate transitions models for resampling of graphics data representing text images for various background and text brightness conditions. Various resampling algorithms are included to accommodate the manner in which the human eye perceived resized lines, such as those often found in text images. For example, the human eye can perceive a resized thin, bright line on a dark background as uniform over its length if (1) its total luminance profile over any perpendicular line cross-section is constant, and (2) any internal profile detail is not resolvable by the eye. It turns out that luminance Y for a point source is purely additive, and thus, the Y values are added before any considerations of eye brightness perception. In contrast, the perception of a dark line on a white background is different than that for the bright line case. The "darkness" of a line, which is 1-Y' (for $0 \leq Y' \leq 1$, or normalized Y') or $1-Y^{0.4}$ approximately, can be preserved by adding the darkness of pixels in a resampled thin line Y' domain. Thus, embodiments of the present invention apply different transition models for relative background and text brightness conditions.

A new gamma value $gm_{dark}=0.4 \times gm$ can be solved which is used in transitions models that preserve dark fine features on a bright background.

Figure 5:
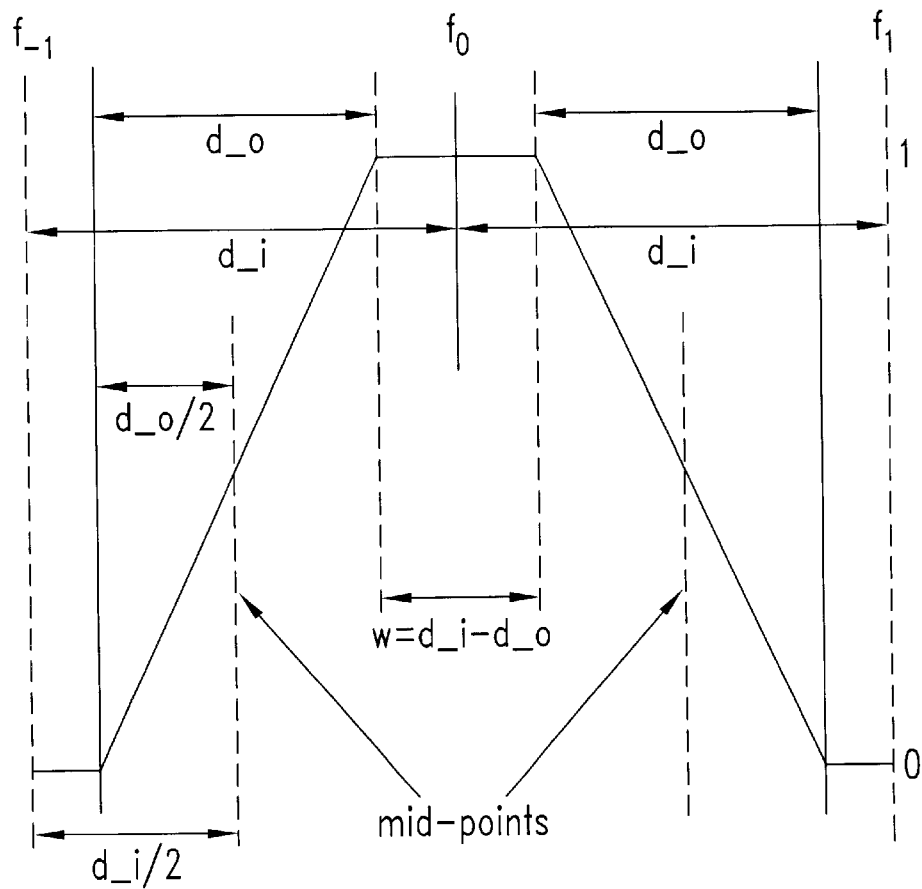
FIG. 5 is a diagram representing samples of graphics data having corresponding sample values.

FIG. 5 illustrates an isolated linear luminance resampling model which preserves output profile sums and feature widths. With respect to the transition models for resampling graphics data representing text images, embodiments of the present invention make use of gray levels (or values that lie between the two text levels) to create a resampled image having partially increasing width and intensity with the addition of some blurring. The additive luminance (Y) and darkness measures discussed earlier are used in the design of the transition models for resampling graphics data representing text images. It turns out that using blurring artifacts creates a resampled image that is much less objectionable than one created using the presentation variations introduced by any conventional pixel replication algorithm.

Sample values for sample pixels $f_{-1}$, $f_0$, and $f_1$ which represent an isolated pixel at $f_0$ are shown in FIG. 5. Proportions of the source pixel in the output model profile can be preserved, and the sloped regions in FIG. 5 centered around the mid-points points between the input samples $f_{-1}$, $f_0$, and $f_1$. The diagonal transition widths remain at one output sample period, thus maintaining fairly sharp edges for all up-sampling ratios.

For the following proof, position and length measurements are normalized to the output sample distance d_o, so that d_o=1 and d_i>1 for up-sampling. If it is assumed that the flat top of the model shown in FIG. 5 has length w'=w, and w<1, and then measuring from a position at the start of the left-hand slope, there will be either two or three samples lying on the profile. Any sample value at 0 does not contribute to the sum of samples on the profile. The height of the model is also normalized to 1, so the slopes have unity gradient.

The sum S of up to three sample values on the model is:

$$S=v_0+v_1+v_2 \quad \text{(EQ 6)}$$

The first sample at fractional position $p_0$ (from 0 to 1) must lie somewhere on the left slope, so its value is given by:

$$v_0=p_0 \quad \text{(EQ 7)}$$

The next step is to show that S is constant for all possible values of $p_0$. A constant value allows a uniform presentation of detail for any output sample phase with respect to the input samples. The second sample lies at position $p_0+1$.

Case 1: If $p_0+1>1+w'$ then the position of the second sample $p_1$ lies beyond the top, on the right hand slope, which also means that (as the right slope has length 1) $p_2$ lies completely beyond the model (as the model is for an isolated pixel) and therefore $v_2=0$. The distance down the slope is $(p_0+1)-(1+w')=p_0-w'$, and the slope has a negative unity gradient, so:

$$v_1=1-(p_0-w') \quad \text{(EQ 8)}$$

The sum of EQ 6 is therefore:

$$S=(p_0)+(1-p_0+w')+(0)=1+w' \quad \text{(EQ 9)}$$

Case 2: If $p_0+1 \leq 1+w'$ then $w'>p_0$, and $p_1$ lies on the top of the model so $v_1=1$. Now $p_2$ lies on the right slope at position $p_0+2$. The right edge of the model is at position $w'+2$, so that $p_2$ lies at a distance $(w'+2)-(p_0+2)=w'-p_0$ back from the right edge. The slope is unity, so:

$$v_2=w'-p_0 \quad \text{(EQ 10)}$$

The sum of EQ 6 is therefore:

$$S=(p_0)+(1)+(w'-p_0)=1+w' \quad \text{(EQ 11)}$$

The sum is the same for both cases 1 and 2. Thus, the result for w'=w, w<1 have been proved. If $w \geq 1$ then take:

$$w'=(w)mod(1) \quad \text{(EQ 12)}$$

to reduce w' to the range that has already been proved. A unit-height rectangle of length Floor(w) has essentially been removed from the middle region in a model with a wide top. Then at the end, we add back to S the amount removed when w was reduced, ending up with the same result, so:

$$S=1+w \quad \text{(EQ 13)}$$

is true for all $w \geq 0$. This means that we can obtain uniform profiles independent of w and at any up-sample ratio.

The previous result demonstrates that the value of w can be increased (and therefore increase the profile brightness or darkness later tied to S) independently of the up-sample ratio, and yet maintain uniform feature appearance. However, increasing w may increase feature widths at the expense of visibly non-uniform gaps in between. Thus, pixels would have to be established as even more isolated to ensure such a method could be used.

Note in FIG. 5 that 1+w=d_i in units normalized to d_o, so that $$S=d\_i/d\_o=\text{upsample\_ratio} \quad \text{(EQ 14)}$$

Also note that the distance between the slope centers in FIG. 5 is also S, so the perceived thickness in output pixels should also be proportional to S as we would expect from up-sampling.

The linear slopes of FIG. 5 are useful if it is assumed there is a linear relationship between a quantity and its perception.

As discussed earlier, luminance for isolated light pixels, and darkness for isolated dark pixels are such quantities. Also discussed earlier was how to parameterize a cubic curve for the models in terms of gradients and sample values. These elements are now brought together to design transition models that work in the computationally efficient Y' (i.e., the gamma corrected luminance) domain. For insight, the results for any monitor gamma value have been generalized. As mentioned previously, embodiments of the present invention use different transitions models depending on the relative background and text brightness.

For isolated light pixels, we want to preserve constant luminance Y as discussed previously. The properties of gamma are now required to relate Y' to Y, as the model shown in FIG. 5 now applies to Y. The simple inverse gamma function is applied to the model. Inverse gamma preserves the sample values at 0 and 1, but changes the shape of the linear slopes. For linear Y the normalized gradients are:

$$gr_{lt} = gr_{dk} = 1 \quad (EQ\ 15)$$

For Y' we must modify the gradients to correspond to the application of the inverse gamma function. From the equation:

$$Y' = Y^{\frac{1}{gm}} \quad (EQ\ 16)$$

the derivative of Y' with respect to Y is:

$$\frac{d}{dY}Y' = \frac{Y^{\frac{1}{gm}-1}}{gm} \quad (EQ\ 17)$$

This equation is used to obtain the gradient $gr_{lt}$ (at Y=1) as:

$$gr_{lt} = \frac{1}{gm} \quad (EQ\ 18)$$

Note that this equation relates a gradient to a gamma value. If the cubic fit is constrained to preserve the gamma-corrected mid-level, then it is not necessary for to determine the gradient of the gamma curve at the dark pixel.

The coefficients for the cubic model EQ 5 described earlier are solved using a unit step with ($f_1=1$, $f_0=0$, so k=1, $gr_0 = gr_{dk}$ and $gr_1 = gr_{lt}$), to obtain at x=½:

$$(gr_{lt} + gr_{dk} - 2)\left(\frac{1}{2}\right)^3 + \quad (EQ\ 19)$$

$$(3 - gr_{lt} - 2gr_{dk})\left(\frac{1}{2}\right)^2 + gr_{dk}\left(\frac{1}{2}\right) = \left(\frac{1}{2}\right)^{\frac{1}{gm}}$$

The gamma gm is eliminated using the equation for $gr_{lt}$ and is solve for the gradient $gr_{dk}$ to obtain:

$$gr_{dk} = 8\left(\frac{1}{2}\right)^{gr_{lt}} - 4 + gr_{lt} \quad (EQ\ 20)$$

providing a means of determining the gradient $gr_{dk}$. The gradients $gr_{lt}$ and $gr_{dk}$, from EQ 18 and EQ 20, respectively, can be pre-evaluated in software as they are only dependent upon gamma gm, which is a constant for a given display device. The visible profile can be adjusted by changing the gamma values from the ideal for a given monitor, but at the expense of some uniformity which may be visible on test patterns.

For isolated dark pixels, a gamma value $gm_{dark}$ (a value of 0.4 gm) is used in EQ 17 instead to obtain:

$$gr_{lt} = \frac{1}{0.4 \times gm} \quad (EQ\ 21)$$

As with isolated light pixels, the gradient grit is used in EQ 20 to obtain $gr_{dk}$. This provides the model gradients $gr_{lt}$ and $gr_{dk}$ for a given monitor gamma at the isolated dark pixels. Note that if gm is 2.5 for a typical monitor, then $gr_{dk}$ and $gr_{lt}$ are both exactly 1 and the model of FIG. 5 applies to Y' directly.

In the case where neither pixel is isolated and no emphasis is required, the nature of the transition is not critical because there is enough distance around the transition that the eye cannot perceive any non-uniformity for different models. As luminance and darkness cannot both be precisely preserved, then any gamma in the range gm to $gm_{dark}$ can be used.

In the case of transitions with both pixels emphasized, alternating pixels are involved so each model's profile interferes with its neighbor, thus making it impossible to correctly emphasize pixels. As a compromise, a model that is visually pleasing in the Y' domain is created having a reasonably uniform presentation. It is difficult to resample a text model at this frequency and have the resulting image appear uniform at close up-sampling ratios. Instead, the alternations are interpreted as a sine-wave having an angular frequency π. The constraint of requiring single output-period transitions used in emphasized text is removed. If a transition model:

$$Y' = \sin\left(\frac{\pi}{2}p\right) \quad (EQ\ 22)$$

is used for fractional sample position p=0 to 1, then the transition from Y'=0 to 1 is obtained. Differentiating the equation yields:

$$\frac{d}{dp}Y' = \frac{\pi}{2}\cos\left(\frac{\pi}{2}p\right) \quad (EQ\ 23)$$

which yields a gradient for EQ 22 of $gr_{dk}=\pi/2$ at p=0, and a gradient of $gr_{lt}=0$ at p=1. In the Y domain, using:

$$Y = (Y')^{gm} \quad (EQ\ 24)$$

we substitute the equation for Y' from EQ 22, and then differentiate to get:

$$\frac{dY}{dp} = \frac{gm\pi\cos\left(\frac{\pi}{2}p\right)\left(\sin\left(\frac{\pi}{2}p\right)\right)^{gm-1}}{2} \quad (EQ\ 25)$$

so if the gamma gm>1 then the derivative of Y is $gr_{dk}=0$ at p=0 and $gr_{lt}=0$ at p=1. The gradients agree at the light pixel p=1 between Y' and Y, but are very different at the dark pixel, p=0. A compromise gradient at p =0 can be used. The pair of values:

$$gr_{dk} = 0.5$$

$$gr_{lt} = 0 \quad (EQ\ 26)$$

seem to work quite well for displaying alternating pixels, but the $gr_{dk}$ value should probably be adjustable, even though it appears to be independent of gm. Ultimately, it is not possible to get a consistent presentation of alternating pixels for smaller up-sample ratio values, although excellent results are obtained for up-sample ratio values on or over 1.5.

A method for identifying isolated and alternating pixels shall now be described. Embodiments of the present invention may employ the following method to determine from pixel samples which of the different transitions models to apply during a resampling operation.

The simplest method of finding isolated pixels is to check independently along each axis that a candidate pixel is text, and that the pixel values either side have the same sample value which is also different from the candidate value. Alternating pixels are flagged when two "isolated" pixels are found next to each other. However, an issue with determining which model to apply arises with this one-dimensional scheme at corners formed by the meeting of perpendicular single-pixel lines. For example, at the bottom left of a "t" character on its row before the lowest, the x-axis check would first show an isolated pixel, and then a simple boundary on the lowest row. This engages different emphasis modes on the two rows, resulting in a visible kink' in the vertical edge at the corner An alternative method is to perform isolated pixel detection in two dimensions. The 1-d test described above is used for all the pixels enclosed within a sample region as illustrated in Figure A. Any isolated pixel transitions found in the outer ring of pixels are then extend to the inner four, as long as the edges are the same. For example, with a pattern:

| variable values | Variable names | | | |
|---|---|---|---|---|
| 0 1 0 0 | f00 | f01 | f02 | f03 |
| 1 1 0 0 | f10 | f11 | f12 | f13 |
| 0 0 0 0 | f20 | f21 | f22 | f23 |
| 0 0 0 0 | f30 | f31 | f32 | f33 |

An isolated 1 pixel is detected at f00 and f01. As f10==f11, and f20==f21, and f11≠f21, we can extend the isolated pixel status of f10 to f11 for x-axis transition enhancement. Similar operations extend f01 status to f11, marking this pixel for y-axis enhancement as well.

Alternative embodiments of the present invention may include a method for resampling graphics data representing diagonal lines. As mentioned previously, conventional resampling algorithms result in resampled diagonal lines that either appear too wide or narrow compared with vertical or horizontal lines. That is, two bright lines of the same height can be compared, one at 45 degrees, and the other vertical. Both lines have a single pixel horizontal cross-section and have the same number of pixels. Consequently, both lines have the same overall quantity of luminance. However, the diagonal line is $\sqrt{2}$ longer, so its luminance per unit length is correspondingly reduced. If the diagonal line cross-section is made two pixels wide instead, then it appears too bright by the same factor.

Thus, embodiments of the present invention up-sample the diagonal line cross-section (perpendicular to the line direction) by $\sqrt{2}$ to create a line of the correct brightness. Thin lines at angles other than 45 degrees are actually approximated in text by appropriate two-pixel combinations of horizontal, vertical, and 45 degree lines, as is obtained from a typical Bresenham line-drawing algorithm. Bresenham lines tend to be slightly non-uniform in appearance because the algorithm switches between these 3 cases (only two for a given angle) as it attempts to be as close to the original line as possible. The switching patterns are also very sensitive to angle. Adding to the complexity of fitting to these lines is undesirable since it may involve considering an almost unlimited number of adjacent pixels. Therefore, these kinks are preserved and the common 45 degree case is widened to achieve a more uniform luminance.

Diagonal pixels in the four samples surrounding an output sample can be reliably detected if the samples form an emphasized diagonal. For example:

| variable values | variable names | | | |
|---|---|---|---|---|
| 0 1 0 0 | f00 | f10 | f20 | f30 |
| 0 1 0 0 | f01 | f11 | f21 | f31 |
| 0 0 1 0 | f02 | f12 | f22 | f32 |
| 0 0 1 0 | f03 | f13 | f23 | f33 |

All the "1" value pixels are marked as isolated in the x-axis, and none are marked in the y-axis. Further tests detect that f11 and f22 are emphasized, and that f12 and f21 are not. This type of qualification triggers use of a diagonal emphasis model. If triggered, the 2×2 central matrix of the sample region is rotated by 45 degrees to obtain the component perpendicular to a more ideal "ridge," (i.e., along f11<->f22 in the example). Thus, one model is evaluated rather than two separable x and y-axis models.

In hardware, as two x-axis models are normally evaluated between f11<->f21, and f12<->f22, and the results are used as the samples into the y-axis model, we can save separate hardware by reusing this same hardware for diagonal emphasis. The x-axis model can be bypassed altogether, and the distance of the output pixel from the ridge between f11 and f22 is calculated. The fractional sample position is given by:

$$d_{11-22}=|\Delta x-\Delta y| \quad \text{(EQ 27)}$$

where $\Delta x$ and $\Delta y$ are the two fractional positions (i.e., normalized to the range 0 to 1) along each axis of the output sample within its surrounding four input samples. A similar result holds for the other case of a diagonal ridge from f12<->f11:

$$d_{12-21}=|\Delta x+\Delta y-1| \quad \text{(EQ 28)}$$

The distances are then given to the y-axis resample circuit. The up-sampling ratio to use in this text transition model should be that of the axis with the smaller ratio, as this helps maintain line uniformity.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method for determining a transition model between input pixel samples from which output sample values are calculated, the input pixel samples having corresponding input sample values, the method comprising:

determining from the input sample values a brightness condition;

using a first transition model that preserves a constant luminance where the brightness condition is indicative of light isolated pixels;

using a second transition model that preserves a constant darkness where the brightness condition is indicative of dark isolated pixels;

using a third transition model that is based on a sine-model having an angular frequency of π where the brightness condition is indicative of alternating light and dark pixels; and calculating output sample values based on the transition model used.

2. The method of claim 6 wherein the first transition model comprises a cubic polynomial model solved using a light gradient value $gr_{lt}$ and a dark gradient value $gr_{dk}$ having the values:

$$gr_{lt} = \frac{1}{gm},$$

and $$gr_{dk} = 8\left(\frac{1}{2}\right)^{gr_{lt}} - 4 + gr_{lt},$$

where gm is a display gamma value.

3. The method of claim 2 wherein the display gamma value is equal to 2.5.

4. The method of claim 6 wherein the second transition model comprises a cubic polynomial model solved using a light gradient value $gr_{lt}$ and a dark gradient value $gr_{dk}$ having the values:

$$gr_{lt} = \frac{1}{0.4 \times gm},$$

and $$gr_{dk} = 8\left(\frac{1}{2}\right)^{gr_{lt}} - 4 + gr_{lt},$$

where gm is a display gamma value.

5. The method of claim 4 wherein the display gamma value is equal to 2.5.

6. The method of claim 1 wherein the input pixel samples are arranged in a coordinate system and the method further comprises:

detecting a diagonal pixel pattern from the input sample values;

where a diagonal pixel pattern is detected, modifying the coordinate system in which the pixel samples are arranged; and calculating a fractional position using the modified coordinate system at which the output sample values are to be calculated using the appropriate transition model.

7. The method of claim 6 wherein modifying the coordinate system comprises rotating the coordinate system by 45 degrees.

8. A method for calculating output sample values from input sample values corresponding to respective input pixel samples, the method comprising:

comparing sample values of a selected sample set of input sample values;

determining from the sample values of the sample set whether a first or second brightness condition is present;

where the first brightness condition is detected, defining a first emphasis model for the sample set and where the second brightness condition is detected, defining a second emphasis model for the sample set, the first brightness condition comprises an isolated light pixel condition and the second brightness condition comprises an isolated dark pixel condition; and calculating output sample values from the defined emphasis model.

9. The method of claim 8 wherein the first emphasis model comprises a cubic polynomial model solved using a light gradient value $gr_{lt}$ and a dark gradient value $gr_{dk}$ having the values:

$$gr_{lt} = \frac{1}{gm},$$

and $$gr_{dk} = 8\left(\frac{1}{2}\right)^{gr_{lt}} - 4 + gr_{lt},$$

where gm is a display gamma value.

10. The method of claim 9 wherein the display gamma value is equal to 2.5.

11. The method of claim 8 wherein the second emphasis model comprises a cubic polynomial model solved using a light gradient value $gr_{lt}$ and a dark gradient value $gr_{dk}$ having the values:

$$gr_{lt} = \frac{1}{0.4 \times gm},$$

and $$gr_{dk} = 8\left(\frac{1}{2}\right)^{gr_{lt}} - 4 + gr_{lt},$$

where gm is a display gamma value.

12. The method of claim 11 wherein the display gamma value is equal to 2.5.

13. The method of claim 8, further comprising:

determining whether a third brightness condition is present from the sample set of input sample values, the third brightness condition comprising alternating light and dark pixels; and if the third brightness condition is present, defining a third emphasis model for the sample set.

14. The method of claim 13 wherein the third emphasis model comprises a sine-model having an angular frequency of π.

15. The method of claim 13 wherein the third emphasis model comprises a cubic transition model using a light gradient value $gr_{lt}=0$ and a dark gradient value $gr_{dk}=0.5$.

16. The method of claim 13 wherein determining whether a third brightness condition is present from the sample set of input sample values comprises:

selecting sixteen pixel samples arranged in a four-by-four pixel array from the sample set;

identifying along a first axis pixel samples having pixels on either side having equal sample values; and identifying along a second axis pixel samples having pixels on either side having equal sample values, the second axis perpendicular to the first axis.

17. The method of claim 8, further comprising:

determining whether a fourth brightness condition is present from the input sample values, the fourth brightness condition comprising a transition in pixel brightness without emphasis; and if the fourth brightness condition is present, defining a fourth emphasis model for the sample set.

18. The method of claim 8 wherein the input pixel samples are arranged in a coordinate system and the method further comprises:

detecting a diagonal pixel pattern from the input sample values;

where a diagonal pixel pattern is detected, modifying the coordinate system in which the pixel samples are arranged; and calculating a fractional position using the modified coordinate system at which the output sample values are to be calculated using the appropriate transition model.

19. The method of claim 18 wherein modifying the coordinate system comprises rotating the coordinate system by 45 degrees.

20. A resampling circuit adapted to receive signals representing respective input sample values for corresponding pixel samples and calculating output sample values therefrom, the resampling circuit comparing sample values of a selected sample set of input sample values, determining from the sample values of the sample set whether a first or second brightness condition is present, where the first brightness condition is detected, defining a first emphasis model for the sample set and where the second brightness condition is detected, defining a second emphasis model for the sample set, and calculating output sample values from the defined emphasis model the first brightness condition comprises an isolated light pixel condition and the second brightness condition comprises an isolated dark pixel condition.

21. The resampling circuit of claim 20 wherein the first emphasis model comprises a cubic polynomial model solved using a light gradient value $gr_{lt}$ and a dark gradient value $gr_{dk}$ having the values:

$$gr_{lt} = \frac{1}{gm},$$

and $$gr_{dk} = 8\left(\frac{1}{2}\right)^{gr_{lt}} - 4 + gr_{lt},$$

where gm is a display gamma value.

22. The resampling circuit of claim 21 wherein the display gamma value is equal to 2.5.

23. The resampling circuit of claim 20 wherein the second emphasis model comprises a cubic polynomial model solved using a light gradient value $gr_{lt}$ and a dark gradient value $gr_{dk}$ having the values:

$$gr_{lt} = \frac{1}{0.4 \times gm},$$

and $$gr_{dk} = 8\left(\frac{1}{2}\right)^{gr_{lt}} - 4 + gr_{lt},$$

where gm is a display gamma value.

24. The resampling circuit of claim 23 wherein the display gamma value is equal to 2.5.

25. The resampling circuit of claim 20 further adapted to determine whether a third brightness condition is present from the sample set of input sample values, the third brightness condition comprising alternating light and dark pixels, and if the third brightness condition is present, define a third emphasis model for the sample set.

26. The resampling circuit of claim 25 wherein the third emphasis model comprises a sine-model having an angular frequency of π.

27. The resampling circuit of claim 25 wherein the third emphasis model comprises a cubic transition model using a light gradient value $gr_{lt}$=0 and a dark gradient value $gr_{dk}$=0.5.

28. The resampling circuit of claim 25 wherein determining whether a third brightness condition is present from the sample set of input sample values comprises:

selecting sixteen pixel samples arranged in a four-by-four pixel array from the sample set;

identifying along a first axis pixel samples having pixels on either side having equal sample values; and identifying along a second axis pixel samples having pixels on either side having equal sample values, the second axis perpendicular to the first axis.

29. The resampling circuit of claim 20 further adapted to determine whether a fourth brightness condition is present from the input sample values, the fourth brightness condition comprising a transition in pixel brightness without emphasis, and if the fourth brightness condition is present, defining a fourth emphasis model for the sample set.

30. The resampling circuit of claim 20 further adapted to detect a diagonal pixel pattern from the input sample values, where a diagonal pixel pattern is detected, modify a coordinate system in which the pixel samples are arranged, and calculate a fractional position using the modified coordinate system at which the output sample values are to be calculated using the appropriate transition model.

31. The method of claim 30 wherein modifying the coordinate system comprises rotating the coordinate system by 45 degrees.

32. A graphics processing system, comprising:

a bus interface for coupling to a system bus;

a graphics processor coupled to the bus interface to process graphics data;

address and data busses coupled to the graphics processor to transfer address and graphics data to and from the graphics processor;

display logic coupled to the data bus to drive a display; and a resampling circuit coupled to the graphics processor and the display logic and adapted to receive signals representing respective input sample values for corresponding pixel samples and calculating output sample values therefrom, the resampling circuit comparing sample values of a selected sample set of input sample values, determining from the sample values of the sample set whether a first or second brightness condition is present, where the first brightness condition is detected, defining a first emphasis model for the sample set and where the second brightness condition is detected, defining a second emphasis model for the sample set, and calculating output sample values from the defined emphasis model, the first brightness condition comprises an isolated light pixel condition and the second brightness condition comprises an isolated dark pixel condition.

33. The graphics processing system of claim 32 wherein the first emphasis model comprises a cubic polynomial model solved using a light gradient value $gr_{lt}$ and a dark gradient value $gr_{dk}$ having the values:

$$gr_{lt} = \frac{1}{gm},$$

and $$gr_{dk} = 8\left(\frac{1}{2}\right)^{gr_{lt}} - 4 + gr_{lt},$$

where gm is a display gamma value.

34. The graphics processing system of claim 33 wherein the display gamma value is equal to 2.5.

35. The graphics processing system of claim 32 wherein the second emphasis model comprises a cubic polynomial model solved using a light gradient value $gr_{lt}$ and a dark gradient value $gr_{dk}$ having the values:

$$gr_{lt} = \frac{1}{0.4 \times gm},$$

and $$gr_{dk} = 8\left(\frac{1}{2}\right)^{gr_{lt}} - 4 + gr_{lt},$$

where gm is a display gamma value.

36. The graphics processing system of claim 35 wherein the display gamma value is equal to 2.5.

37. The graphics processing system of claim 32 wherein the resampling circuit is further adapted to determine whether a third brightness condition is present from the sample set of input sample values, the third brightness condition comprising alternating light and dark pixels, and if the third brightness condition is present, define a third emphasis model for the sample set.

38. The graphics processing system of claim 37 wherein the third emphasis model comprises a sine-model having an angular frequency of π.

39. The graphics processing system of claim 37 wherein the third emphasis model comprises a cubic transition model using a light gradient value $gr_{lt}=0$ and a dark gradient value $gr_{dk}=0.5$.

40. The graphics processing system of claim 37 wherein determining whether a third brightness condition is present from the sample set of input sample values comprises:
   selecting sixteen pixel samples arranged in a four-by-four pixel array from the sample set;
   identifying along a first axis pixel samples having pixels on either side having equal sample values; and
   identifying along a second axis pixel samples having pixels on either side having equal sample values, the second axis perpendicular to the first axis.

41. The graphics processing system of claim 32 wherein the resampling circuit is further adapted to determine whether a fourth brightness condition is present from the input sample values, the fourth brightness condition comprising a transition in pixel brightness without emphasis, and if the fourth brightness condition is present, defining a fourth emphasis model for the sample set.

42. The graphics processing system of claim 32 wherein the resampling circuit is further adapted to detect a diagonal pixel pattern from the input sample values, where a diagonal pixel pattern is detected, modify a coordinate system in which the pixel samples are arranged, and calculate a fractional position using the modified coordinate system at which the output sample values are to be calculated using the appropriate transition model.

43. The graphics processing system of claim 42 wherein modifying the coordinate system comprises rotating the coordinate system by 45 degrees.

44. A method for determining a transition model between input pixel samples from which output sample values are calculated, the input pixel samples having corresponding input sample values, the method comprising:
   determining from the input sample values a brightness condition;
   using a first transition model that preserves a constant luminance where the brightness condition is indicative of light isolated pixels; and
   using a second transition model that preserves a constant darkness where the brightness condition is indicative of dark isolated pixels;
   using a cubic transition model solved using a light gradient value grlt=0 and a dark gradient value grdk=0.5 where the brightness condition is indicative of alternating light and dark pixels; and
   calculating output sample values based on the transition model used.

45. The method of claim 44 wherein the first transition model comprises a cubic polynomial model solved using a light gradient value $gr_{lt}$ and a dark gradient value $gr_{dk}$ having the values:

$$gr_{lt} = \frac{1}{gm},$$

and $$gr_{dk} = 8\left(\frac{1}{2}\right)^{gr_{lt}} - 4 + gr_{lt},$$

where gm is a display gamma value.

46. The method of claim 45 wherein the display gamma value is equal to 2.5.

47. The method of claim 44 wherein the second transition model comprises a cubic polynomial model solved using a light gradient value $gr_{lt}$ and a dark gradient value $gr_{dk}$ having the values:

$$gr_{lt} = \frac{1}{0.4 \times gm},$$

and $$gr_{dk} = 8\left(\frac{1}{2}\right)^{gr_{lt}} - 4 + gr_{lt},$$

where gm is a display gamma value.

48. The method of claim 47 wherein the display gamma value is equal to 2.5.

49. The method of claim 44 wherein determining a brightness condition from the input sample values comprises:
   selecting sixteen pixel samples arranged in a four-by-four pixel array from the sample set;
   identifying along a first axis pixel samples having pixels on either side having equal sample values; and
   identifying along a second axis pixel samples having pixels on either side having equal sample values, the second axis perpendicular to the first axis.

50. The method of claim 44 wherein the input pixel samples are arranged in a coordinate system and the method further comprises:
   detecting a diagonal pixel pattern from the input sample values;
   where a diagonal pixel pattern is detected, modifying the coordinate system in which the pixel samples are arranged; and
   calculating a fractional position using the modified coordinate system at which the output sample values are to be calculated using the appropriate transition model.

51. The method of claim 50 wherein modifying the coordinate system comprises rotating the coordinate system by 45 degrees.

* * * * *

UNITED STATES PATENT AND TRADEMARK OFFICE
CERTIFICATE OF CORRECTION

PATENT NO. : 6,751,362 B2
DATED : June 15, 2004
INVENTOR(S) : Keith R. Slavin

It is certified that error appears in the above-identified patent and that said Letters Patent is hereby corrected as shown below:

Title page,
Item (56), References Cited, OTHER PUBLICATIONS, "Kochanek" reference, reads "vol. 18, No. 13, Jul. 1984. pp. 33-41." should read -- vol. 18, No. 13, Jul. 1984, pp. 33-41. --

Column 1,
Line 40, reads "at least a similar" should read -- at least similar --

Column 3,
Line 7, reads "two pixels) a problem" should read -- two pixels), a problem --

Column 4,
Line 7, reads "an operator or an" should read -- an operator of an --

Column 5,
Line 3, reads "from an local memory" should read -- from a local memory --
Line 59, reads "further includes is a text" should read -- further includes a text --

Column 7,
Line 23, reads "is representation of four" should read -- is a representation of four --
Lines 56-57, reads "model are of interest results in coefficients:" should read --model of interest results in coefficients: --

Column 8,
Line 13, reads "with an cubic model" should read --with a cubic model --

Column 9,
Line 2, reads "each O has a 0 neighbor)," should read-- each 0 has a 0 neighbor), --
Line 15, reads "human eye perceived" should read -- human eye perceives --

Column 10,
Line 28, reads "so that $p_2$, lies at a distance" should read -- so that $p_2$ lies at a distance --

Column 11,
Line 41, reads "necessary for to determine" should read -- necessary to determine --
Line 55, reads "is solve for the gradient" should read -- is solved for the gradient --

UNITED STATES PATENT AND TRADEMARK OFFICE
CERTIFICATE OF CORRECTION

PATENT NO. : 6,751,362 B2
DATED : June 15, 2004
INVENTOR(S) : Keith R. Slavin

It is certified that error appears in the above-identified patent and that said Letters Patent is hereby corrected as shown below:

Column 12,
Line 45, reads "gradient of $gr_{lt,}=0$ at p=1." should read -- gradient of $gr_{lt}=0$ at p=1. --

Column 13,
Line 22, reads "visible kink' in the" should read -- visible kink in the --

Column 14,
Line 25, reads "ideal "ridge," (i.e., along" should read -- ideal "ridge" (i.e., along --
Line 44, reads "$d_{12\text{-}21}=|\Delta x+\Delta y\text{-}1$"should read -- $d_{12\text{-}21}=|\Delta x+\Delta y\text{-}1|$ --

Column 15,
Lines 63 and 64-65, reads "condition comprises an" should read
-- condition comprising an --

Column 17,
Lines 22-23, reads "comprises" should read -- comprising --

Column 18,
Lines 49-50 and 51, reads "comprises" should read -- comprising --

Signed and Sealed this

Twenty-sixth Day of July, 2005

JON W. DUDAS
*Director of the United States Patent and Trademark Office*